3,146,259
FLUORENYL BISGLYOXAL DERIVATIVES
Elvin L. Anderson, Moorestown, N.J., assignor to Smith Kline & French Laboratories, Philadelphia, Pa., a corporation of Pennsylvania
No Drawing. Filed June 13, 1961, Ser. No. 116,679
7 Claims. (Cl. 260—518)

This invention relates to novel fluorenyl bisglyoxal derivatives. More specifically, this invention relates to bisglyoxalyl fluorenes and their corresponding hydrates, alcoholates, alkali metal bisulfite salts and carbonyl functional derivatives.

The novel fluorenyl bisglyoxal derivatives of this invention are useful as antiviral agents, particularly with respect to distemper virus, influenza virus ($PR_8$), hepatitis virus ($MHV_3$), neurotropic virus (CLM), Herpes simplex, adenovirus, Newcastle disease virus, Coxsackie virus, Echo virus and hemadsorption virus; especially influenza and herpetic viruses.

The fluorenyl bisglyoxal derivatives are represented by the following fundamental formula:

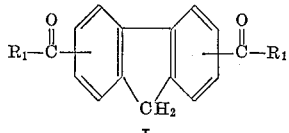

I where $R_1$ represents

—CHO,

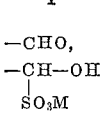

where M is a nontoxic alkali metal, preferably sodium or potassium,

where $R_2$ is hydrogen or a hydrocarbon radical containing from 1 to 12 carbon atoms inclusive,

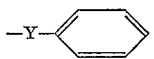

where Y is

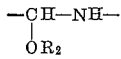

or —CH=N— and $R_2$ is as defined above,

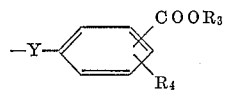

where Y is as defined above, $R_3$ is hydrogen or lower alkyl of from 1 to 4 carbon atoms and $R_4$ is hydrogen or hydroxy,

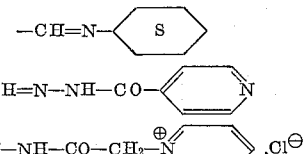

or

—CH(NH—⟨⟩—COOH)$_2$

Advantageous compounds of this invention are represented by the following fundamental formula:

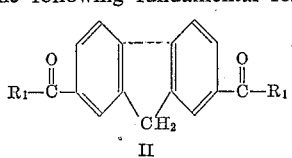

II where $R_1$ represents

—CHO
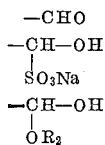

where $R_2$ is hydrogen, a lower saturated or unsaturated aliphatic hydrocarbon radical of from 1 to 8 carbon atoms, inclusive, or a benzyl radical,

—Y—⟨⟩ where Y is

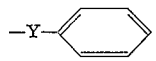

or —CH=N— and $R_2$ is as defined immediately above,

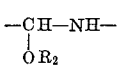

where Y is as defined immediately above, $R_3$ is hydrogen or lower alkyl of from 1 to 4 carbon atoms and $R_4$ is hydrogen or hydroxy,

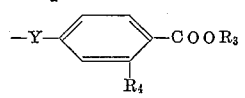

or

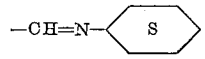

Preferred compounds of this invention are represented by Formula II above where $R_1$ represents

where Y is

or —CH=N— and $R_2$ is hydrogen or lower alkyl of from 1 to 8 carbon atoms, particularly methyl or ethyl, or

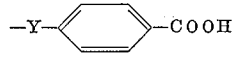

The fluorenyl bisglyoxals of this invention are readily prepared from the corresponding diacetyl fluorenes by oxidation with an agent such as selenium dioxide. The acetyl fluorenes are obtained by a Friedel-Crafts acylation with acetyl chloride under standard conditions (aluminum chloride in carbon disulfide).

The diacetyl fluorene is reacted with selenium dioxide in a suitable organic solvent such as dioxane, tetrahydrofuran, acetone, ethanol, benzene, and the like. Theoretically two moles of selenium dioxide are required for one mole of diacetyl fluorene. However, an excess such as from about 3 to about 7 moles of oxidizing agent is employed for each mole of starting material. The reaction is carried out at a temperature in the range of from about 30° C. up to the boiling point of the solvent used and for from about 30 minutes to 8 hours. Preferably the reaction is carried out at from about 50–100° C. for about 1 to 6 hours. Filtering the reaction mixture and adding water to the filtrate yields the fluorenyl bisglyoxal hydrates. Oxidation under anhydrous conditions such as in anhydrous dioxane, yields the anhydrous glyoxals.

Alternatively, the fluorenyl bisglyoxals are prepared from corresponding bis-haloacetyl or -dihaloacetyl fluorenes which are obtained by Friedel-Crafts acylation with haloacetyl or dihaloacetyl halide. Preferably the halogen is chlorine or bromine. Also, the bis-dihaloacetyl derivatives are prepared by direct halogenation of the diacetyl fluorene, preferably with chlorine or bromine, in an unreactive organic solvent such as chloroform, carbon tetrachloride, methylene chloride and the like, or preferably glacial acetic acid. The bis-haloacetyl fluorene is converted to the bisglyoxal via the Sommelet reaction, that is refluxing the halide with hexamethylenetetramine followed by decomposition of the quaternary ammonium salt with water. The bis-dihaloacetyl fluorene is converted to the bisglyoxal by reaction with an alkali metal alcoholate such as sodium or potassium methylate or ethylate in a suitable solvent, usually anhydrous lower alcohols, to form the corresponding bisglyoxalyl acetal derivatives. The reaction is preferably run at about 40–60° C. for from 1–3 hours with the reaction maintained at pH 7. The acetal compound is then hydrolyzed with dilute acid such as 3% sulfuric or hydrochloric acid in a suitable solvent such as acetic acid to form the bisglyoxalyl derivative.

The hydrate or alcoholate derivatives of this invention are prepared from the anhydrous bisglyoxal by reaction with water or an alcohol, usually at room or slightly elevated temperature such as up to about 100° C. for from about 10 minutes to about 10 hours.

The alcoholates are advantageously prepared by reacting the anhydrous bisglyoxal or hydrate thereof with an alcohol, usually in an excess of the alcohol with gentle heating between from about 50° C. to about 80° C. Alternatively, the bisglyoxal hydrate can be heated in an excess of an anhydrous alcohol with azeotropic removal of the water formed employing an organic solvent such as benzene, xylene or toluene, to give the desired alcoholate.

The fluorenyl bisglyoxal alkali metal bisulfite salts of this invention are prepared by reacting the bisglyoxal, anhydrous or hydrated with approximately two equivalents of preferably sodium or potassium bisulfite.

The aminocarbinol derivatives of Formula I where Y is

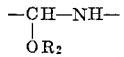

are prepared by condensing the fluorenyl bisglyoxal alcoholate with an aniline, aminobenzoic acid or aminosalicylic acid, or lower alkyl esters thereof, with elimination of water. Advantageously, approximately two molar equivalents of the bisglyoxalyl alcoholate per mole of the amino reactant in an inert organic solvent are reacted at from about 25° C. to about the boiling point of the solvent employed for from about 15 minutes to about 24 hours. Preferably the reaction time is from about 30 minutes to 8 hours at temperatures from about 40°–100° C. Using the bisglyoxalyl alcoholate as the starting material, it is advantageous to use the corresponding anhydrous alcohol as the reaction solvent. It is often advantageous to prepare the bisglyoxalyl alcoholate in situ from the corresponding hydrate by a brief reflux in the desired alcohol in the presence of sulfuric acid. The aminocarbinol condensation derivative is usually isolated by filtration or evaporation of the solvent.

The methyleneimino derivatives of Formula I where Y is —CH=N— are prepared by decomposition of the corresponding aminocarbinol derivatives prepared as described above. The decomposition is accomplished by heating the aminocarbinol to a temperature of from about 70° C. to about 140° C., preferably under reduced pressure of about 0.01–15 mm. of mercury and in the absence of solvent in an anhydrous atmosphere. Although the time necessary for decomposition is variable, at 100–120° C. and a pressure of 0.1–15 mm. of mercury the reaction is complete in about 1–10 hours. Alternatively the decomposition is accomplished at atmospheric pressure by infrared heating at 100–150° C.

The methyleneimino derivatives are alternatively prepared by reacting the anhydrous fluorenyl bisglyoxal with an aniline, aminobenzoic acid or aminosalicylic acid, or lower alkyl esters thereof. The reaction is carried out in the absence of solvents or in an inert, anhydrous organic solvent such as toluene or xylene. In the absence of a solvent, the reaction is carried out at from about 90°–125° C. for from about 6–10 hours. When a solvent is employed the reaction is conveniently run at the reflux temperature of the solvent for from about 6–10 hours.

The cyclohexyliminomethylene derivatives of formula I are prepared by condensing either the fluorenyl bisglyoxal or its alcoholate or hydrate with cyclohexylamine in a suitable organic solvent such as a lower alkanol, an ether for example ethyl ether, dioxane or tetrahydrofuran, a hydrocarbon for example benzene or toluene, or a halogenated solvent for example chloroform, carbon tetrachloride and the like. Preferably the solvent is a lower alkanol, especially isopropyl alcohol. The condensation is advantageously carried out at relatively low temperatures such as from about −10° C. to about 40° C. for from about 10–60 minutes. The product is isolated by filtration or evaporation of the solvent.

The isonicotinoyl hydrazone derivatives of Formula I are prepared by condensing either the fluorenyl bisglyoxal or its alcoholate or hydrate with isonicotinic acid hydrazide in an organic solvent of the alcoholic type or in an inert one such as ether, benzene, dioxane, tetrahydrofuran and the like. The reaction temperature is in the range of from 20–25° C. up to the boiling point of the solvent employed, preferably between about 50° C. and 100° C. Generally the reaction is complete in about 2–8 hours with the product isolated by filtration of the precipitate.

The methinylhydrazidomethylpyridinium chloride derivatives of Formula I are prepared by condensing either the fluorenyl bisglyoxal or its alcoholate or hydrate with acethydrazide pyridinium chloride in an unreactive organic solvent, preferably a lower alkanol, for example methanol, ethanol or isopropanol. Advantageously a condensing agent such as acetic acid is present. The reaction is usually complete in from about 30 minutes to about four hours at the reflux temperature of the solvent employed. The product is isolated by cooling or by evaporation of the solvent.

The bis (bisaminobenzoic acid) adducts of Formula I are prepared by condensing either the fluorenyl bisglyoxal or its hydrate with an excess of the aminobenzoic acid in preferably an alcoholic type solvent, for example methanol or ethanol. The reaction is usually carried out at the reflux temperature of the solvent for from 30 minutes to 8 hours. The product is isolated by cooling and filtering.

The novel compounds of this invention described fully above are useful as prophylactic agents and chemotherapeutic drugs for the treatment of viral infections and diseases. Some of these compounds also have a specialized utility. For example the methinylhydrazidomethylpyridinium salts are very water soluble thereby leading themselves in particular to subcutaneous administration or topical applications, for example in the form of a collyrium. Further the isonicotinoyl hydrazones are particularly useful in the treatment of viral infections and diseases of the skin and eyes.

From the above description it is obvious that one skilled in the art can design minor variations of this invention. Such variations are intended to be included in the scope of this invention as equivalents to the basic invention herein fully described. For example the compounds of Formula I where $R_1$ represents

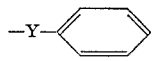

the benzene ring may be substituted by nitro, sulfamido, amino, methylamino, acetylamino, hydroxy, methoxy, acetoxy, halogen or methyl radicals and the like. Further, in addition to the methinylhydrazidomethylpyridinium chloride derivatives of Formula I other methinylhydrazidomethyl quaternary salts may be employed such as trimethylammonium, methylpyridinium, methylpyrrolidinium, methylmorpholinium, methyl- and dimethyl-N-methylpiperazinium chlorides or bromides. In general, $R_1$ as described represents aldehydo derived moieties having a maximum of 20 carbon atoms.

The following specific examples are not limiting but illustrate the novel compounds of this invention and make fully apparent the practice of this invention to one skilled in the art.

Example 1

To a stirred mixture of 22.2 g. of selenium dioxide, 150 ml. of dioxane and 10 ml. of water at 60° C. is added 20.0 g. of 2,7-diacetylfluorene. The mixture is refluxed for five hours and then cooled to 25° C. and filtered. The filtrate is diluted with water and cooled to precipitate 2,7-bisglyoxalylfluorene hydrate which after recrystallization from aqueous acetic acid melts at 217.5–218.5° C.

Similarly, running the above reaction in anhydrous dioxane under anhydrous conditions, filtering the reaction hot followed by partial evaporation and cooling yields the anhydrous 2,7-bisglyoxalylfluorene.

Example 2

A mixture of 5.0 g. of 2,7-bisglyoxalylfluorene hydrate in 150 ml. of absolute ethyl alcohol is heated at reflux for several hours. The clear solution is evaporated slightly and then cooled to give 2,7-bisglyoxalylfluorene ethylate.

Similarly, by following the above procedure 5.0 g. of 2,7-bisglyoxalylfluorene hydrate is reacted with an excess of other alcohols to give the corresponding methylate, n-propylate, isopropylate, n-butylate, allylate, propargylate and the like of 2,7-bisglyoxalylfluorene.

Example 3

To suspension of 25.8 g. of 2,7-bisglyoxalylfluorene hydrate in 250 ml. of dioxane is added 23.0 g. of sodium bisulfite dissolved in 150 ml. of water. The mixture is heated on the steam bath for 20 minutes, cooled to 10° C. and then filtered to give the 2,7-bisglyoxalylfluorene sodium bisulfite salt.

Example 4

To 15.7 g. of 2,7-bisglyoxalylfluorene hydrate in 150 ml. of ethanol is added one drop of concentrated sulfuric acid. The mixture is refluxed for 15 minutes to form the 2,7-bisglyoxalylfluorene ethylate and then 13.4 g. of p-aminobenzoic acid is added. The refluxing is continued for 30 minutes and the precipitated solid is filtered hot to give 2,7-bis[α-ethoxy-α-(4-carboxyphenylamino)-acetyl]-fluorene.

A portion of the latter compound (500 mg.) is dissolved in water containing two molar equivalents of sodium hydroxide to give the disodium salt upon evaporation.

Similarly, reacting any of the alcoholates of Example 2 according to the above procedure with two molar equivalents of p-aminobenzoic acid gives the analogous 2,7-bisacetylfluorene derivatives.

Example 5

The 2,7-bis[α-ethoxy-α-(4-carboxyphenylamino)-acetyl]-fluorene (5.0 g., Example 4) is heated in a vacuum oven at 0.1 mm. and 105° C. for four hours to give after washing with acetone the product 2,7-bis[(4-carboxyphenyl)-iminoglyoxylidine]-fluorene.

Example 6

A mixture of 4.9 g. of 2,7-bisglyoxalylfluorene hydrate and 100 ml. of anhydrous n-octyl alcohol in 250 ml. of anhydrous benzene is heated at reflux for 12 hours over a water trap (Org. Syn. 3, 382) having an inner funnel containing a mixture of phosphorus pentoxide and a filter aid. The mother liquor is then concentrated in vacuo to give the bis n-octylate of 2,7-bisglyoxalylfluorene.

Similarly, by following the above procedure 4.9 g. of 2,7-bisglyoxyalylfluorene hydrate is reacted with an excess of other alcohols to give the corresponding bis n-hexylate, cyclohexylate, citronellylate, phenylate and benzylate of 2,7-bisglyoxalylfluorene.

Example 7

A solution of 17.1 g. of 2,7-bisglyoxalylfluorene methylate (prepared as in Example 2) in 150 ml. of methanol is treated with 9.4 g. of aniline and refluxed for one hour. Cooling separates 2,7-bis[α-methoxy-α-(phenylamino)-acetyl]-fluorene.

Similarly, reacting any of the alcoholates of Example 2 as described above with two molar equivalents of aniline gives the analogous 2,7-bisacetylfluorene derivatives.

Example 8

A mixture of 13.9 g. of anhydrous 2,7-bisglyoxalylfluorene (Example 1), 9.4 g. of aniline and 250 ml. of anhydrous xylene is heated at reflux for 8–10 hours. The precipitate is filtered and dried to give 2,7-bis(phenyliminoglyoxylidine)-fluorene.

Example 9

A mixture of 18.9 g. of 2,7-bisglyoxalylfluorene ethylate (Example 2) and 16.6 g. of ethyl p-aminobenzoate in 450 ml. of ethanol is heated at reflux for three hours. Evaporation of the solvent and cooling separates 2,7-bis[α-ethoxy-α-(4-carbethoxyphenylamino)-acetyl]-fluorene.

Example 10

A mixture of 13.9 g. of anhydrous 2,7-bisglyoxalylfluorene (Example 1), 13.8 g. of o-aminobenzoic acid and 350 ml. of anhydrous toluene is refluxed for 10 hours. The precipitate obtained is 2,7-bis[(2-carboxyphenyl)-iminoglyoxylidine]-fluorene.

Example 11

A mixture of 15.7 g. of 2,7-bisglyoxylfluorene hydrate (Example 1) and 13.8 g. of p-aminobenzoic acid in 250 ml. of benzene is warmed on the steam bath for two hours to give 2,7-bis[α-hydroxy-α-(4-carboxyphenylamino)-acetyl]-fluorene.

Example 12

A solution of 3.1 g. of 2,7-bisglyoxalylfluorene hydrate and 3.0 g. of p-aminosalicylic acid in 125 ml. of tetrahydrofuran is refluxed for three hours, cooled and filtered to give 2,7-bis[α-hydroxy-α-(4-carboxy-3-hydroxyphenylamino)-acetyl]-fluorene.

Similarly, reacting 3.7 g. of 2,7-bisglyoxalylfluorene hydrate and 3.3 g. of methyl p-aminosalicylate yields 2,7-bis[α-hydroxy-α-(4-carbomethoxy-3-hydroxyphenylamino)-acetyl]-fluorene.

Example 13

A solution of 3.7 g. of 2,7-bisglyoxalylfluorene hydrate in 25 ml. of isopropanol is cooled to 0° C. and treated with a solution of 2.0 g. of cyclohexylamine in 10 ml. of isopropanol. After stirring at this temperature for one hour, the reaction mixture is concentrated in vacuo and the precipitate filtered to yield 2,7-bis(cyclohexyliminoglyoxylidine)-fluorene.

Example 14

A mixture of 3.7 g. of 2,7-bisglyoxalylfluorene hydrate and 2.7 g. of isonicotinic acid hydrazide in 150 ml. of ethanol is refluxed for three hours. Cooling separates the crystalline bisisonicotinoyl hydrazone of 2,7-bisglyoxalylfluorene.

Example 15

A mixture of 3.7 g. of 2,7-bisglyoxalylfluorene hydrate, 4.0 g. of acethydrazide pyridinium chloride, 5 ml. of glacial acetic acid and 40 ml. of absolute ethanol is heated at reflux for three hours. The mixture is concentrated and cooled to give 2,7-bis(carbonylmethinyl-hydrazidomethylpyridinium chloride)-fluorene.

Similarly, reacting 3.7 g. of 2,7-bisglyoxalylfluorene hydrate as described above with 3.6 g. of acethydrazide trimethylammonium chloride yields 2,7-bis(carbonylmethinylhydrazidomethyltrimethylammonium chloride)-fluorene.

*Example 16*

A mixture of 3.6 g. of 2,7-bisglyoxalylfluorene and 4.0 g. of p-aminobenzoic acid in 100 ml. of ethanol is heated at reflux for two hours. The reaction mixture is cooled and filtered. The solid product is washed with acetone to yield pure 2,7-bis[bis-(4-carboxyphenylamino)-acetyl]-fluorene.

*Example 17*

A solution of 3.5 g. of 2,7-bisglyoxalylfluorene ethylate (Example 2) in 75 ml. of methanol is treated with 2.8 g. of p-nitroaniline and refluxed for two hours. Cooling separates 2,7 - bis[α-ethoxy - α - (4 - nitrophenylamino) - acetyl]-fluorene.

Similarly, reacting 3.5 g. of 2,7-bisglyoxalylfluorene ethylate as described above with 2.2 g. of p-aminoaniline, 2.2 g. of p-hydroxyaniline or 3.2 g. of 3,4-dichloroaniline yields the corresponding amino-, hydroxy- or 3,4-dichlorophenylamino fluorene derivatives.

What is claimed is:
1. A chemical compound having the formula:

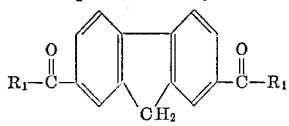

in which $R_1$ is a member selected from the group consisting of

—CHO,

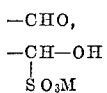

in which M is a nontoxic alkali metal, $$-CH-OH$$
$$\ \ \ |$$
$$\ \ \ OR_2$$

in which $R_2$ is a member selected from the group consisting of hydrogen, alkyl containing from 1 to 12 carbon atoms inclusive and benzyl,

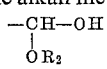

in which Y is a member selected from the group consisting of

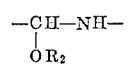

and CH=N— and $R_2$ is as defined above,

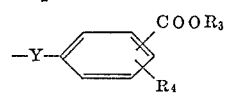

in which Y is as defined above and $R_3$ is a member selected from the group consisting of hydrogen and lower alkyl having from 1 to 4 carbon atoms and $R_4$ is a member selected from the group consisting of hydrogen and hydroxy,

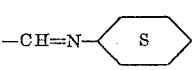

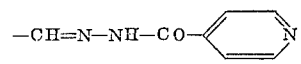

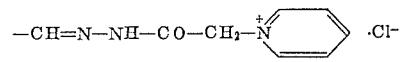

and

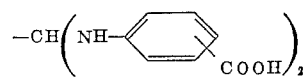

2. A chemical compound having the formula:

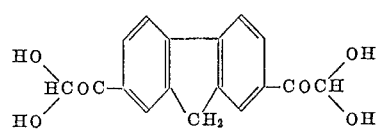

3. A chemical compound having the formula:

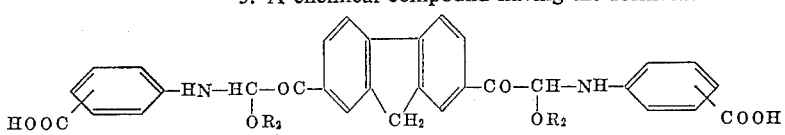

in which $R_2$ is alkyl containing from 1 to 12 carbon atoms, inclusive.

4. A chemical compound having the formula:

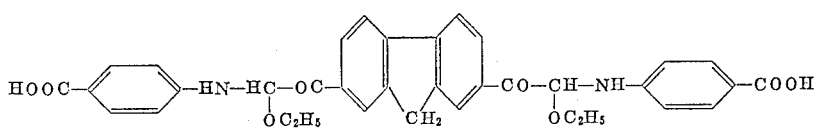

5. A chemical compound having the formula:

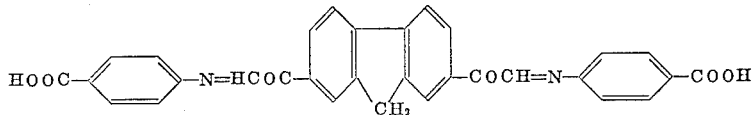

6. A chemical compound having the formula:

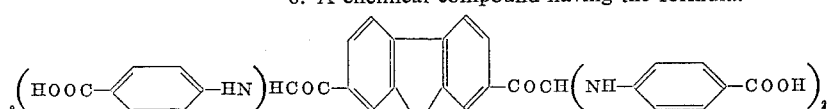

7. A chemical compound having the formula:

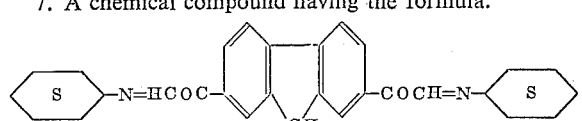

References Cited in the file of this patent

Royals et al.: Chemical Abstracts, 51, 3537–38 (1957). (Copy in Lib.)